July 1, 1930.  H. I. MORRIS  1,769,187
MACHINE FOR CUTTING STRIPS
Original Filed May 5, 1919   3 Sheets-Sheet 1
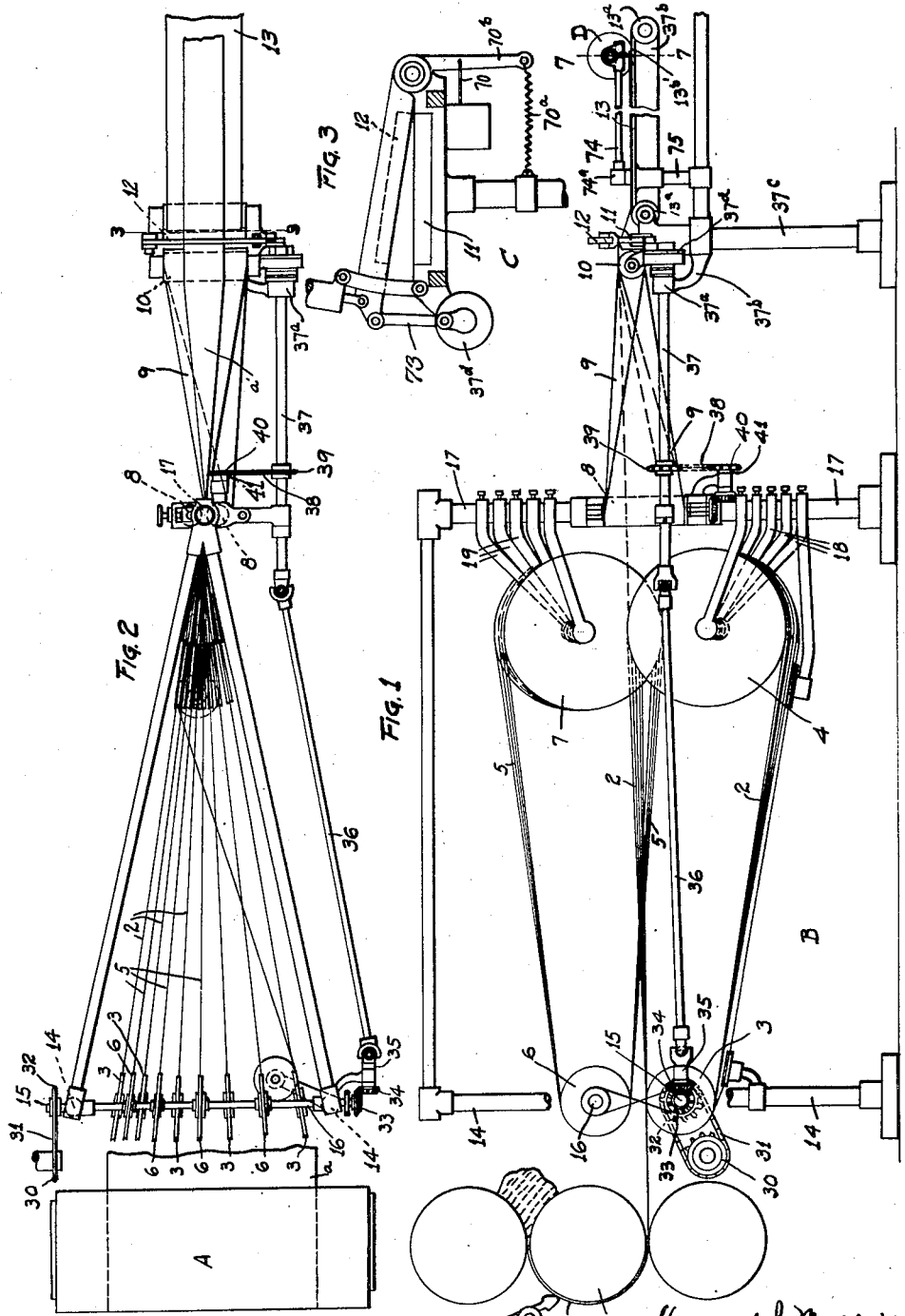

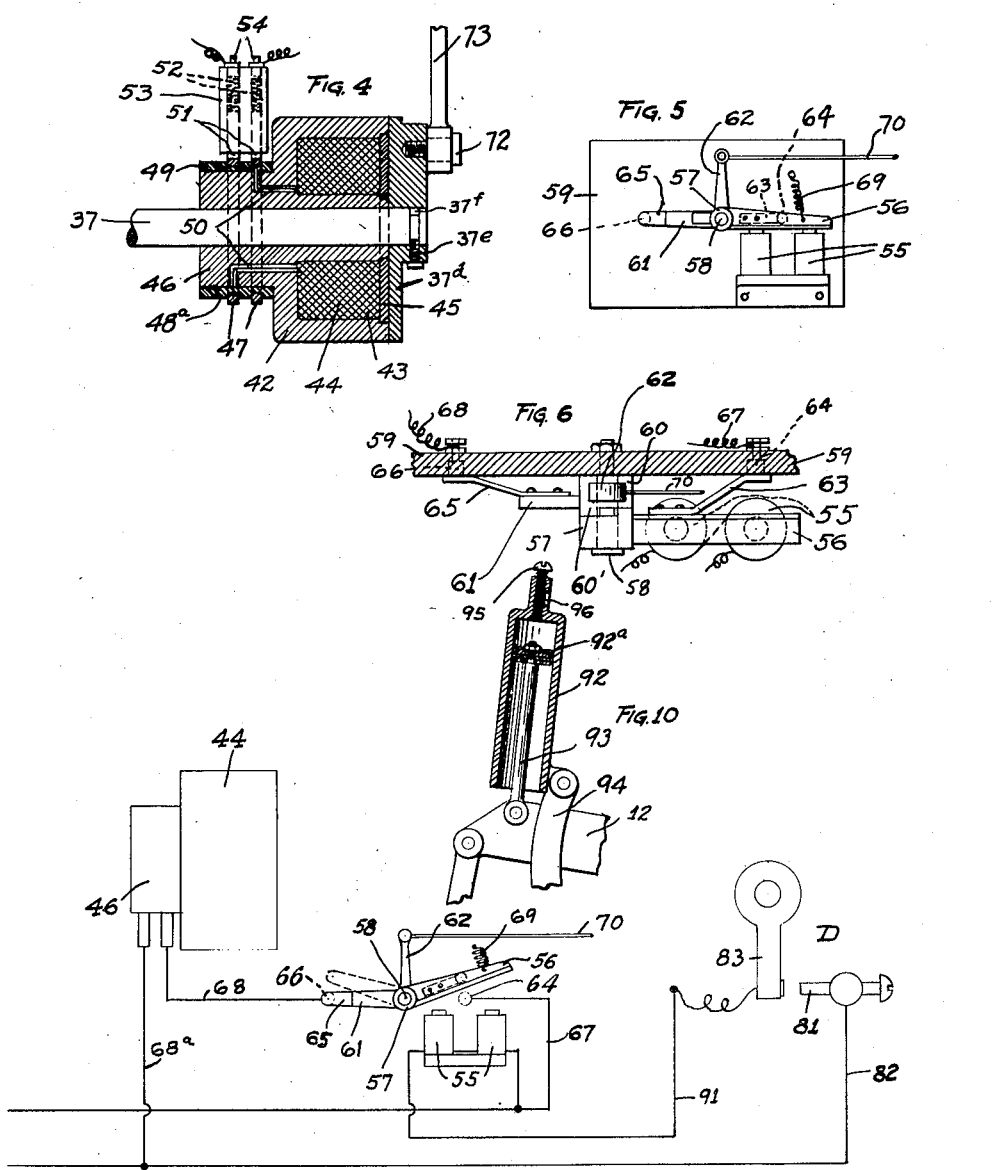

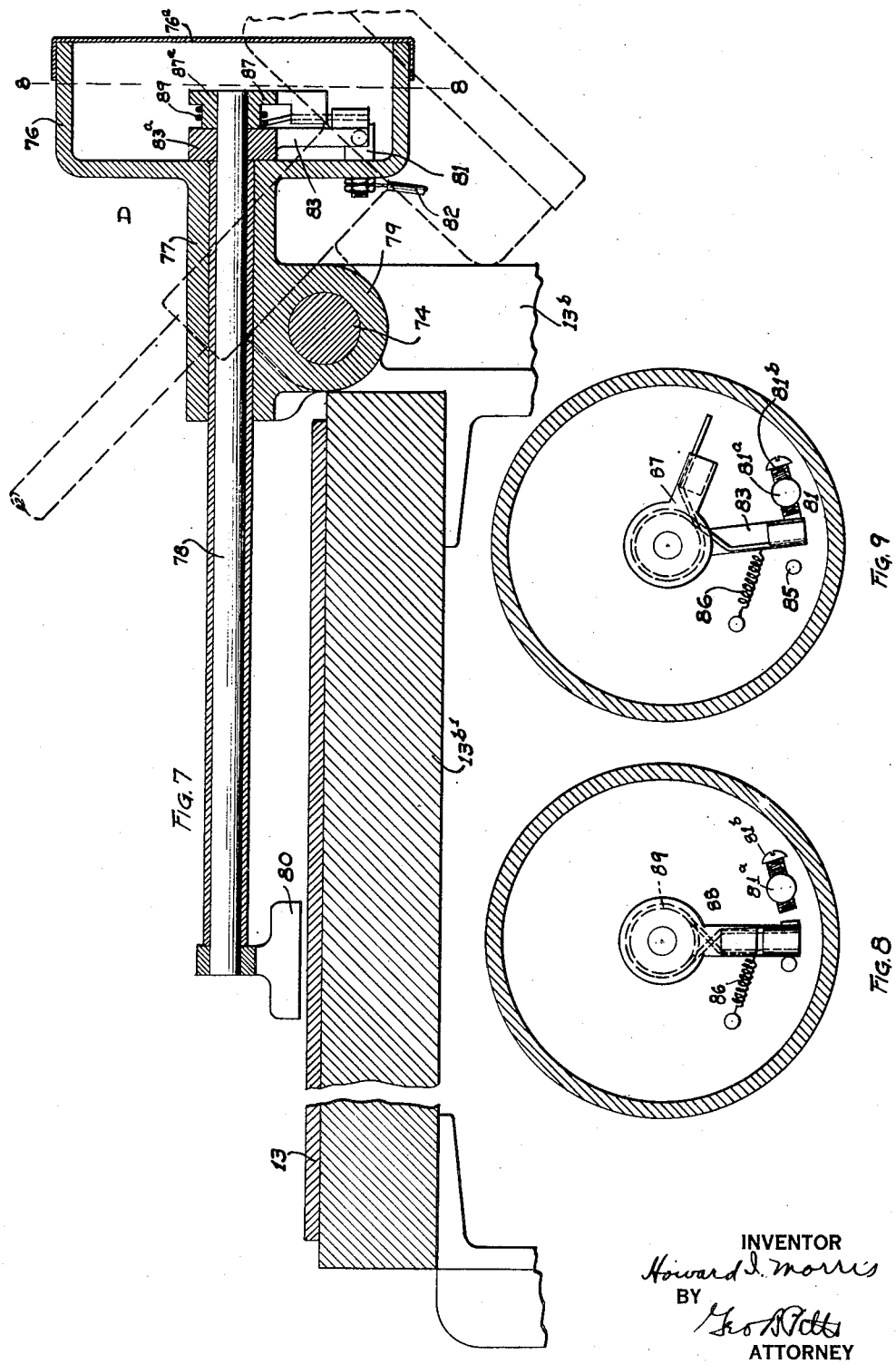

Patented July 1, 1930

1,769,187

UNITED STATES PATENT OFFICE

HOWARD I. MORRIS, OF LAKEWOOD, OHIO, ASSIGNOR, BY MESNE ASSIGNMENTS, TO THE YODER-MORRIS COMPANY, OF CLEVELAND, OHIO, A CORPORATION OF OHIO

MACHINE FOR CUTTING STRIPS

Original application filed May 5, 1919, Serial No. 294,733. Divided and this application filed May 9, 1925. Serial No. 29,256.

This invention relates to a machine for cutting strips, particularly flat strips or ribbons of material. As this application is a division of my application filed May 5, 1919, Serial No. 294,733, the mechanism is illustrated in connection with the manufacture and supply of tread material for tire carcasses; but it will be understood that the mechanism for making the sheet of rubber and the illustrated form of the mechanism for folding and supplying the tread form no part of the present invention.

One object of the invention is to provide improved means for cutting a ribbon of material, such as a tire tread, whereby predetermined portions thereof may be severed from the supplied portion.

Another object of the invention is to provide an improved mechanism for automatically cutting strips transversely while the latter are being fed endwise.

Another object of the invention is to provide an improved mechanism for automatically cutting strips of material into sections of predetermined lengths.

Another object of the invention is to combine with a ribbon or strip forming mechanism a means for cutting the ribbon or strip into predetermined lengths while being supplied and without affecting the feed thereof.

Other objects of the invention will hereinafter appear from the following description of a preferred embodiment thereof and will be more readily understood by reference to the accompanying drawings, illustrating such preferred form of my apparatus, in which Fig. 1 is a side elevation.
Fig. 2 is a plan view thereof.
Fig. 3 is a sectional view on the line 3—3 of Fig. 2, illustrating the knife or shearing means for cutting the strip into predetermined lengths.
Fig. 4 is a sectional view illustrating the magnetic clutch preferably employed in the actuation of the automatic shearing or cutting means.
Figs. 5 and 6 are sectional details illustrating the relay and circuit connections, controlling the magnetic clutch, and the means for closing and breaking such circuit.

Fig. 7 is a section (enlarged) on the line 7—7 of Fig. 1.
Figs. 8 and 9 are sections on the line 8—8 of Fig. 7, the former showing contact arm in normal position and the latter showing the arm in circuit closing position.
Fig. 10 is a fragmentary detail view, partly in section of the cushioning means for the knife.
Fig. 11 is a diagrammatic view.

In the drawings, A represents calender rolls for producing a thin sheet of heated rubber $a$, the rolls shown being of standard construction and having associated with one thereof suitable trimming knives 29, only one of which is shown. B indicates as an entirety the mechanism for folding the sheet of rubber into superimposed folds to provide the tread material $a'$. Of this mechanism, 2 indicates a series of converging wires or cables running over suitable sheaves 3, 4, and upon which the thin plastic sheet or rubber is supported. The plastic sheet of rubber extends slightly beyond the cables at both sides so that a small portion of rubber drops down by gravity at the outside edge of the respective outside cables. These cables are mounted on the sheaves 3, 4, so as to form a continuous belt or conveyor. At the receiving end these sheaves 3 are spaced apart so that the distance between the respective outside sheaves is slightly less than the width of the rubber sheet to be folded, while at the discharge end of such conveying and folding mechanism the sheaves 4 are arranged very close together. Each pair of sheaves may be provided with a single cable forming a continuous belt about such pair of sheaves, or one continuous wire cable may be used running from one pair of sheaves back to the next pair and thereover and thus progressively running over all of the sheaves and after passing over the last sheave be brought back to the first sheave in any well known manner.

While a sheet of thin plastic rubber thus carried upon the spaced conveying means will sag and drop by gravity in between the respective cables and thus form folds therein, I prefer to provide means for insuring such folding and for holding the folds in position.

In the drawings I have illustrated such means as a second set of cables 5, carried by suitable sheaves 6, mounted at the receiving end above the conveyor sheaves 3 and running over sheaves 7 at the discharge end, such sheaves 7 being arranged in staggered relation with respect to the sheaves 4 at the discharge end of the conveyor so that they extend down between adjoining sheaves thereof. The second set of cables 5 thus carried by these sheaves crosses through between the respective conveyor cables at a point between the receiving end of the conveyor cables and the discharge end thereof and by means of such cables the sagging portions of the rubber sheet between the respective conveyor cables are carried down and folded about such cables and held in position thereby.

After the rubber sheet a has thus been conveyed over the cables 2 and discharged off the end thereof in folded condition, the same is received between a pair of compressing rolls 8. These rolls are vertically arranged, being thus in position to receive the folded sheet directly from the conveying and folding means B just referred to and to compress the folds together so that the sheet in this folded and positioned condition is compacted and formed into a homogeneous mass a'. From such compression rolls 8 the compressed tread or strip is delivered onto a conveyor belt 9. This conveyor belt passes around one of the vertical compression rolls 8 and around a horizontal idler roll 10 and thence back around the compression roll 8. It is thus seen that this belt makes a quarter-turn so that as it leaves the compression roll 8 and moves along toward the roll or sheave 10 it twists from a vertical to a horizontal position.

The compressed strip is carried along with and supported by this conveyor 9 and from the end thereof passes through between two blades 11 and 12 of a shearing or cutting means C and thence onto the conveyor 13.

14 indicates suitable standards of the frame of the machine adapted to support a shaft 15 at the receiving end and upon which the sheaves 3 are mounted. Above this shaft 15 is a second shaft 16 upon which the sheaves 6 are mounted. 17 represents a vertical standard of the frame at the discharge end of the folding mechanism and upon this standard 17 are mounted the respective brackets or arms 18, 19, carrying the sheaves 4 and 7 respectively. Supported from this standard 17 and in a suitable frame are the compression rolls 8. One of the compression rolls 8 is preferably mounted in spring pressed boxes or bearings and thereby held in resilient contact with the companion roll 8. As indicated in the drawings, means may be provided for adjusting the tension of the springs and thereby the pressure of the rolls.

In order to fold the sheet of rubber in such manner as to make a pyramidal tread of the folds, I prefer to use a conveyor, the supporting elements of which converge from the receiving end to the discharge end. For this purpose I have the supporting cables 2 radial to the point of contact between the vertical compression rolls 8. To provide for this and to utilize a single shaft for the sheaves 3 I mount each of the sheaves 3 upon such shaft 15 on a ball and socket or universal joint. The sheaves 6 are preferably respectively mounted upon the shaft 16 by ball and socket or universal joint connections similar to those which support the sheaves 3.

From a sprocket 30 on a driven shaft of the calender a sprocket chain 31 passes about a sprocket 32 on the shaft 15. The end of this shaft 15 is preferably provided with a bevel pinion 33 with which meshes a pinion 34 on a short shaft 35 mounted on the standard 14. A connecting shaft 36 has one end connected by a universal joint with the shaft 35 and its other end similarly connected with a shaft 37. A sprocket chain 38 runs about the sprocket 39 on the shaft 37 and about a sprocket 40, mounted on a shaft 41, supported from the standard 17. The inner end of the shaft 41 is provided with a beveled gear meshing with a beveled gear on the shaft of one of the compressing rolls 8. The outer end of the shaft 37 is mounted in a bearing $37^a$ provided on a bracket $37^b$, which in turn is supported by a standard $37^c$. The free end of the shaft 37 loosely supports a disk $37^d$ whereby the latter may be rotated in the manner to be later set forth. The disk $37^d$ is formed of soft iron for a purpose which will later appear.

The means for operating the shearing or cutting means 11, 12, to automatically cut the tread into predetermined lengths preferably consists of a magnetic clutch for actuating the shears in cutting the tread, a trigger mechanism D for controlling the actuation of the magnetic clutch, and a mechanism for returning the shearing or cutting means to rest in position for each operation.

In Fig. 4 a longitudinal cross section of the magnetic clutch, crank disk and brush holder is shown. The magnetic clutch comprises a steel or iron shell 42 having an annular recess 43 containing the magnetizing coil of wire 44, which coil is retained in place by the ring of fibre 45. The shell 42 has a cylindrical hub 46 to receive the shaft 37 to which it is keyed in any suitable manner so as to be rotated thereby. The hub 46 is provided with an extension $48^a$ upon and around which are mounted two electrical collector rings 47 in suitable insulating material 48 held in place by a retaining ring 49 secured upon the end of the hub extension 46. The clutch shell 42 is mounted on the shaft between the bearing $37^a$ and disk $37^d$ and the latter is prevented from moving endwise on the shaft 37 by a screw 37ᵉ extending into a groove 37ᶠ formed in the shaft—see Fig. 4. The collector rings 47 are connected to the coil 44 by insulated wires 50 (shown diagrammatically). In contact with the outer surface of the collector rings 47 are two brushes 51 held against the rings by springs 52 and enclosed within the brush holder 53 which is provided with two binding screws 54 for connecting the circuit wires thereto.

The conveyor 13 is supported by a pair of rolls 13ª, 13ª, which are supported in any desired manner by a frame 13ᵇ, the inner end of which is supported by the standard 37ᶜ. The frame 13ᵇ includes a plate 13ᵇ on which the conveyor 13 runs, as will be clear from Fig. 7.

The trigger mechanism D is disposed at any desired position along the run of the conveyor 13 relative to the knife edges dependent upon the length of the ribbon section or tread to be cut; but being adjustable longitudinally of the conveyor, it may be positioned to cut the ribbon of material into sections of any predetermined length. Of this mechanism, 74 is a rod extending longitudinally of and at one side of the conveyor 13. At its inner end the rod 74 is provided with a boss 74ª which engages a bracket 75 supported by the frame 13ᵇ. 76 indicates a casing having a hub 77 extending in a direction transversely of the conveyor 13 to support a rock shaft 78. The hub 77 is provided on its lower side with a hollow boss or knuckle 79 through which the rod 74 loosely fits to support the casing 76 in position. The casing is rotatable on the rod 74 for a purpose to be later set forth and also slidable along the rod to adjust the trigger mechanism relative to the knife blades 11, 12, according to the length of the tread sections to be cut. The casing 76 may comprise a cup-shaped member closed by a removable cap 76ª. The rock shaft 78 extends approximately to the center of the conveyor 13 and carries on or near its free end a depending member 80 having its lower edge disposed in the path of movement of the ribbon or tread, as it moves along on the conveyor, so that when the advancing end of the ribbon or tread engages the member 80, it will act through it to rock the shaft 78. The lower portion of the depending member 80 may be widened laterally in opposite directions to provide a relatively wide engaging surface.

81 indicates a contact mounted on the base portion of the casing 76 and preferably comprising a pin 81ª carrying at its outer end a screw 81ᵇ, whereby the contact may be readily adjusted. The contact 81 is connected to a lead 82 which is connected to a source of electrical supply not shown. 83 indicates an arm having a hub 83ª loosely mounted on the outer end of the shaft 78 within the casing 76 and arranged to engage the free end of the screw 81ᵇ to close the circuit therethrough. The arm 83 is normally held against a stop 85 by a spring 86. 87 indicates an operating arm fixed to the inner end of the rock shaft 78 and connected by devices 88 with the arm 83 to operate the latter. The connecting devices 88 preferably comprise a spring 89 coiled around the hub 87ª of the arm 87 and having its legs crossed and extended into engagement with lugs projecting laterally from the inner faces of the arms 83, 87, but disposed at different distances radially so that one will not engage with the other. When the rock shaft 78 is operated it will swing the arm 87 as shown in Fig. 9, and the arm acting through the spring 89 will swing the arm 83 into engagement with the contact screw 81ᵇ. As the arm 83 is connected to a lead 91, the circuit will be closed. By the provision of two arms 83, 87, connected by a spring, it will be seen that the circuit will be closed in the forepart of the movement of the rock shaft 78 and the latter will be free to swing through a long angular distance, at the same time maintaining the contacts together. Upon the passage of the cut tread section or its removal from the conveyor 13, the springs 86 and 89 will return the arms 83, 87 and rock shaft to normal position.

In Figs. 5 and 6 are shown an elevation and enlarged cross section of the relay in which 55 represents a pair of electro magnets connected in series with the contacts of the trigger mechanism. 56 is the armature of the magnets 55 and has a hub 57 that is pivoted upon a pin 58 which is fastened rigidly in a fibre base 59. Also pivoted upon the same pin 58 is another hub 60 carrying two arms or levers 61, 62. Attached to the side of the armature 56 is a contact spring 63 which makes contact when in the position shown on Fig. 5, with a button 64, mounted in the base 59. Attached to the arm 61 is a contact spring 65 which makes contact when in the position shown in page 5, with a button 66 also mounted in the base 59. It will be noted in Fig. 6 that the hubs 57, and 60 are each provided with an interlocking shoulder 60′ whereby a movement of one hub will produce a similar movement of the other hub when such shoulders are in contact with each other, to insure contact between the spring 65 and button 66 when the circuit from the coils 55 is broken. However these shoulders are spaced a short distance apart so as to permit a limited movement of one hub independent of the other as will later appear. It will be noted that the contact springs 63 and 65 make contact with the buttons 64 and 66 only when they lie in direct horizontal alignment and as the wires 67 and 68 are connected through suitable binding screws to the buttons 64, 66, a circuit can only be established when both contacts are made and should either armature 56 or arm 61 be moved upward or arm 62 be moved to the right it will move one or the other contact spring 63 or 65 from its respective button and cause a breaking of the circuit. The wires 67 and 68 are connected in series with the magnetic clutch. The armature 56 is normally held away from the magnet 55 by a spring 69, thereby holding the springs 63 out of contact with the button 64, but when the magnets 55 are energized by the trigger mechanism D establishing the circuit through them, the armature 56 is attracted, making the contact between the spring 63 and button 64, when, as the contact having already been established between the spring 65 and button 66, the circuit will be completed through the magnetic clutch, causing it to attract the disk 37$^d$ which will rotate on the shaft 37 with the clutch and through a crank 72 effect a pulling down on the shear connecting rod 73 and cause the shear knife 12 to make the shearing stroke relative to the knife 11.

As will be understood from Fig. 11, there is one circuit for the relay closed by the contacts 83, 81, and a circuit for the magnetic clutch coil 44, the latter circuit comprising a wire 67 leading from the button 64 to the lead 91, the armature 56 and arm 61, the wire 68 leading from the button 66 to one binding post 54 and a wire 68$^a$ leading from the other binding 54 to the lead 82. Accordingly, it will be seen that when the circuit through the contacts 83, 81, is closed, the magnets 55 will be energized, whereupon the armature 56 will swing downwardly, causing its contact spring 63 to engage the button 64 and thus close the circuit through the coil 44. The coil 44 being energized it will attract the armature disk 37$^d$ and thus effect the shearing or cutting operation as already set forth.

The arm 61 is connected to the arm 12 of the shear knife or blade by the arm 62 and the connecting wire or cable 70 so that when the shear blade has completed the shearing stroke an arm 70$^b$ connected to the blade 12 pulls upon the cable 70 which in turn moves the arm 62 to the right breaking the contact of the spring 65 and the button 66, the effect of which is to deenergize the coil 44 and release the disk 37$^d$ from the magnetic clutch, whereupon a spring 70$^a$, acting through the arm 70$^b$, will swing the latter to its normal position (see Fig. 3).

It will be understood that the interlocking shoulders of hubs 57 and 60 will not permit of both armature 56 and arm 61 being in an upper position at the same time so that after the shear blade has lifted the contact spring 65 it is subsequently restored to normal position of contact with button 66 upon the spring 69 lifting the armature 56 after it is released by the magnets.

In order to prevent any overrunning of the disk 37$^d$ and consequent entire or partial closing of the shear knife 12 after the disk 37$^d$ has been released from the magnetic clutch, and to insure the shearing means C stopping in open position, I prefer to provide an air dash-pot means 92 in connection with the two blades 11, 12, of the shearing means. This dashpot is connected to the two members of the shearing means by any suitable means such, for instance, as a connection 93 between the piston 92$^a$ of the dashpot and the upper blade 12, and a connection 94 between the cylinder of the dashpot and the lower blade 11.

The compression within the cylinder 92 may be controlled by a suitable valve, for example, a screw 95 which opens and closes a port 96 to the desired extent.

By providing for the rotation of the trigger mechanism 76 on the rod 74, the section of tread following the cutting thereof from the supplied portion, may be picked up from the conveyor 13 and removed therefrom; if the section engages with the member 80 or shaft 78 during its removal, these parts will swing upwardly as shown in dotted lines in Fig. 7.

To those skilled in the art and apparatus to which my invention relates, many alterations in and widely differing embodiments and applications thereof will suggest themselves without departing from the spirit and scope of the invention. My disclosures and the description herein are purely illustrative and are not intended to be in any sense limiting.

What I claim is:

1. In apparatus of the class described, the combination of shearing means, and automatic means for actuating the shearing means to cut material into predetermined lengths, said automatic means including a magnetic clutch mounted upon a driven shaft, an element operated by said magnetic clutch to cause the actuation of said shearing means, and means for insuring the stoppage of said shearing means in open position.

2. In apparatus of the class described, the combination of means for shearing material, a magnetic clutch mounted on a driven shaft, an element actuated by said magnetic clutch and connected with a movable member of said shearing means, trigger mechanism adapted to be actuated by the material to cause the energization of said magnetic clutch and operation of said shearing means to cut the material into predetermined lengths, and means operated by the shearing means to break the circuit for said clutch.

3. In apparatus of the class described, the combination of a stationary shearing knife over which the material to be cut is carried, a second knife pivoted thereto forming a shear, in combination with a magnetic clutch mounted on a driven shaft, a mechanism and a circuit including a relay for controlling and actuating said clutch and a circuit breaking device actuated by the pivoted knife to break the circuit after each operation of the knife.

4. In apparatus of the class described, the combination of a cutting mechanism, magnetic means for operating said mechanism, a trigger mechanism, an electric circuit for said magnetic means arranged to be closed by said trigger mechanism, and means independent of said trigger mechanism for breaking the circuit following the operation of said cutting mechanism.

5. In apparatus of the class described, the combination of a support over which material passes, a pair of relatively movable shearing devices, a driven shaft, a magnetic clutch on said shaft, one element of said clutch being keyed to the shaft and the other element loose thereon, a crank and crank rod connection between said loosely mounted element and one of said shearing devices, an electric circuit for the coil of said magnetic clutch, means controlled by the material for closing said circuit, and means controlled by the movable shearing device for opening said circuit independently of said closing means.

6. In apparatus of the class described, the combination of a support over which material passes, a pair of relatively movable shearing devices, a driven shaft, a magnetic clutch, one element of said clutch being keyed to the shaft and the other element loose thereon, a crank and rod connection between the latter element and one of said shearing devices, an electric circuit for the coil of said clutch, two switches in said circuit interconnected whereby either one is maintained by the other in closed position, and means actuated by the material for controlling the closing of said circuit.

7. In apparatus of the class described, the combination of a support over which material passes, a pair of relatively movable shearing devices, means for operating said shearing devices, a rod extending longitudinally of and at one side of said support, a trigger mechanism mounted to slide and trunnion on said rod and arranged to be actuated by the material, and connecting means between said trigger mechanism and said operating means, whereby the latter is operated.

In testimony whereof, I have hereunto affixed my signature.

HOWARD I. MORRIS.